US008963436B2

(12) United States Patent
Nakamura et al.

(10) Patent No.: US 8,963,436 B2
(45) Date of Patent: Feb. 24, 2015

(54) LIGHT EMITTING ELEMENT DRIVING DEVICE

(71) Applicant: Sanken Electric Co., Ltd., Niiza-shi, Saitama (JP)

(72) Inventors: Hiroaki Nakamura, Saitama (JP); Shohei Osaka, Saitama (JP)

(73) Assignee: Sanken Electric Co., Ltd., Niiza-shi, Saitama (JP)

( * ) Notice: Subject to any disclaimer, the term of this patent is extended or adjusted under 35 U.S.C. 154(b) by 42 days.

(21) Appl. No.: 13/738,015

(22) Filed: Jan. 10, 2013

(65) Prior Publication Data

US 2013/0175933 A1   Jul. 11, 2013

(30) Foreign Application Priority Data

Jan. 11, 2012  (JP) .................................. 2012-002867

(51) Int. Cl.
H05B 37/00 (2006.01)
H05B 39/00 (2006.01)
H05B 41/00 (2006.01)
H05B 33/08 (2006.01)

(52) U.S. Cl.
CPC ........ H05B 33/0815 (2013.01); H05B 33/0827 (2013.01)
USPC ........ 315/186; 315/192; 315/193; 315/209 R; 315/299

(58) Field of Classification Search
None
See application file for complete search history.

(56) References Cited

U.S. PATENT DOCUMENTS

| 7,777,704 | B2 * | 8/2010 | S et al. ............................. | 345/82 |
| 2004/0208011 | A1 | 10/2004 | Horiuchi et al. | |
| 2009/0230891 | A1 * | 9/2009 | Zhao et al. ...................... | 315/308 |
| 2012/0081016 | A1 * | 4/2012 | Wu et al. ........................ | 315/192 |
| 2013/0099684 | A1 * | 4/2013 | Cheng et al. ................... | 315/186 |

FOREIGN PATENT DOCUMENTS

JP          2003-332624          11/2003

* cited by examiner

Primary Examiner — Anh Tran
(74) Attorney, Agent, or Firm — Banner & Witcoff, Ltd.

(57) ABSTRACT

A light emitting element driving device, which flashing-drive a plurality of light emitting element arrays connected in parallel by switching elements connected in series with each of the plurality of light emitting element arrays, the light emitting element driving device including: a current detection unit configured to detect respective currents flowing through each of the plurality of light emitting element arrays as currents of the light emitting element arrays; a selection unit configured to select the smallest current of the light emitting element arrays of the detected currents obtained by the current detection unit; and an output voltage control unit configured to control output voltage supplied to the plurality of light emitting element arrays so that the current of the light emitting element arrays selected by the selection unit becomes a preset reference current value.

3 Claims, 5 Drawing Sheets

LIGHT EMITTING ELEMENT DRIVING DEVICE

CROSS-REFERENCE TO RELATED APPLICATION

This application claims priority from Japanese Patent Application No. 2012-002867 filed on Jan. 11, 2012 the entire subject matter of which is incorporated herein by reference.

TECHNICAL FIELD

This disclosure relates to a light emitting element driving device for driving a LED (Light Emitting Diode) which is a light emitting element.

BACKGROUND

A light emitting element driving device is known in which a plurality of light emitting element arrays respectively configured by a plurality of LEDs connected in series are connected in parallel and the plurality of light emitting element arrays are driven by constant current drivers respectively connected in series with each of the light emitting element arrays (for example, see JP-A-2003-332624). In this light emitting element driving device, the lowest voltage of the voltage applied to a plurality of constant current drivers is selected as a detection voltage, and then an output voltage of a power supply device is automatically controlled so that the value of the detected voltage is a reference voltage.

SUMMARY

However, in the background art, it is necessary to set the lowest voltage of the voltage applied to a plurality of constant current drivers to a voltage sufficient to allow the current required to emit light to flow through the light emitting element arrays. Accordingly, an excessive voltage is applied to the plurality of constant current drivers and thus the power loss is caused in the constant current drivers.

With considering the above, this disclosure provides a light emitting element driving device capable of reducing power loss in the switching elements to flashing-drive the light emitting element arrays.

A light emitting element driving device of this disclosure flashing-drives a plurality of light emitting element arrays connected in parallel by switching elements connected in series with each of the plurality of light emitting element arrays. The light emitting element driving device comprises: a current detection unit configured to detect respective currents flowing through each of the plurality of light emitting element arrays as currents of the light emitting element arrays; a selection unit configured to select the smallest current of the light emitting element arrays of the detected currents obtained by the current detection unit; and an output voltage control unit configured to control output voltage supplied to the plurality of light emitting element arrays so that the current of the light emitting element arrays selected by the selection unit becomes a preset reference current value.

Additionally, the above described light emitting element driving device may be includes an average current control unit configured to control each of the duty ratios to drive the plurality of the switching elements to be turned on/off so that the average value of the current of the plurality of light emitting element arrays detected by the current detection unit is equal to each other.

Additionally, in the above described light emitting element driving device, in an ON-period of the switching elements in which any one of the plurality of the switching element is driven to be turned on, the output voltage control unit may control the output voltage based on the current of the light emitting element arrays, and, in an OFF-period of the switching elements in which all of the plurality of the switching elements are controlled to be turned off, the output voltage control unit may control the output voltage based on the current of the light emitting element arrays in the last ON-period of the switching element.

In the above described the light emitting element driving device, the output voltage control unit may be configured to generate a reference voltage correlated to the current of the light emitting element arrays selected by the selection unit and to perform a feedback control of the output voltage based on the reference voltage.

According to this disclosure, the light emitting element driving device is configured to control the output voltage supplied to the plurality of light emitting element arrays so that the smallest current of the current flowing through each of the plurality of light emitting element arrays is a preset reference current value. Accordingly, it is not necessary to use a constant-current driver in order to flashing-drive the light emitting element arrays and thus it is possible to reduce power loss in the switching elements that flashing-drive the light emitting element arrays.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Figure 1:
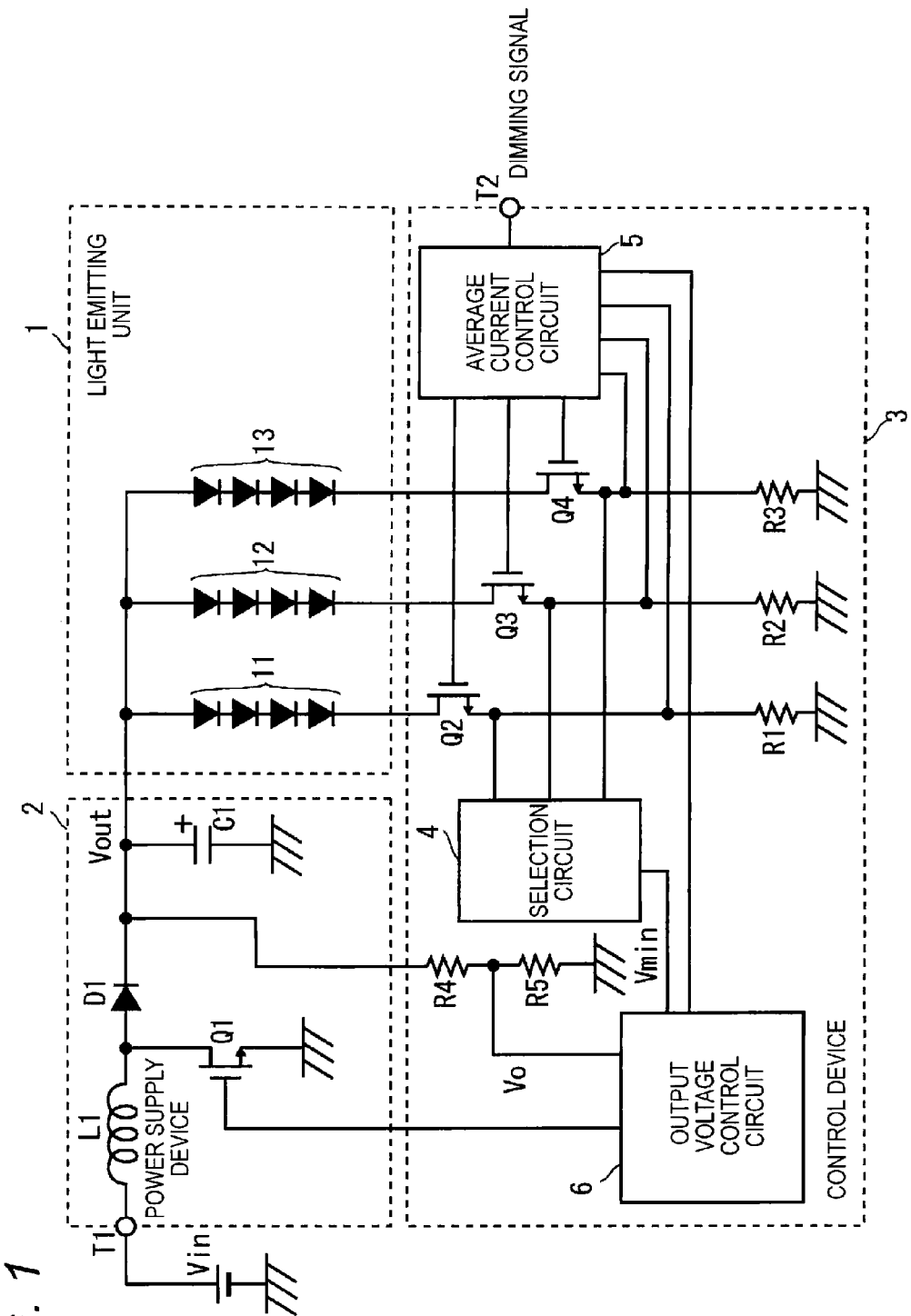
FIG. 1 is a circuit diagram illustrating a circuit configuration of a light emitting element driving device according to an illustrative embodiment of this disclosure.

Referring to FIG. 1, a light emitting element driving device in the present illustrative embodiment includes a light emitting unit 1, a power supply device 2 supplying an output voltage Vout to the light emitting unit 1, and a control device 3 performing a control of the output voltage Vout supplied to the light emitting unit 1 and a lighting control of the light emitting unit 1.

The light emitting unit 1 includes light emitting element arrays 11 to 13, each array having four LEDs connected in series. Although the light emitting unit 1 is configured to include three light emitting element arrays 11 to 13 in the present illustrative embodiment, the number of the light emitting element arrays 11 to 13 or the number of the LEDs connected in series to configure the light emitting element arrays 11 to 13 is not particularly limited, but can be suitably set on the basis of the required amount of light, etc. Further, although the same ones are used as the light emitting element arrays 11 to 13, some degree of variation in characteristics is assumed.

The power supply device 2 in the present illustrative embodiment is a boost chopper circuit and includes a choke coil L1, a diode D1, a smoothing capacitor C1 and a MOSFET Q1. A series circuit configured by the choke coil L1 and the MOSFET Q1 acting as a switching element is connected between an input terminal T1 connected to a positive terminal of DC power supply Vin and an earth terminal. Further, a series circuit configured by the diode D1 as an output rectifier element and the smoothing capacitor C1 is connected between a connection point of the choke coil L1 and the MOSFET Q1 and the earth terminal. Anode-side terminals of the light emitting element arrays 11 to 13 are connected to a connection point of the diode D1 and the smoothing capacitor C1, and the output voltage Vout is boosted by the on-off control of the MOSFET Q1 and supplied to the light emitting element arrays 11 to 13.

The control device 3 includes MOSFETs Q2 to Q4, resistors R1 to R5, a selection circuit 4, an average current control circuit 5 and an output voltage control circuit 6. A series circuit configured by the MOSFET Q2 to flashing-drive the light emitting element array 11 and the resistor R1 is connected between a cathode-side terminal of the light emitting element array 11 and the earth terminal. Similarly, a series circuit configured by the MOSFET Q3 to flashing-drive the light emitting element array 12 and the resistor R2 is connected between a cathode-side terminal of the light emitting element array 12 and the earth terminal, and a series circuit configured by the MOSFET Q4 to flashing-drive the light emitting element array 13 and the resistor R3 is connected between a cathode-side terminal of the light emitting element array 13 and the earth terminal. The MOSFETs Q2 to Q4 have the same properties and the resistors R1 to R3 have the same resistance value.

Figure 2:
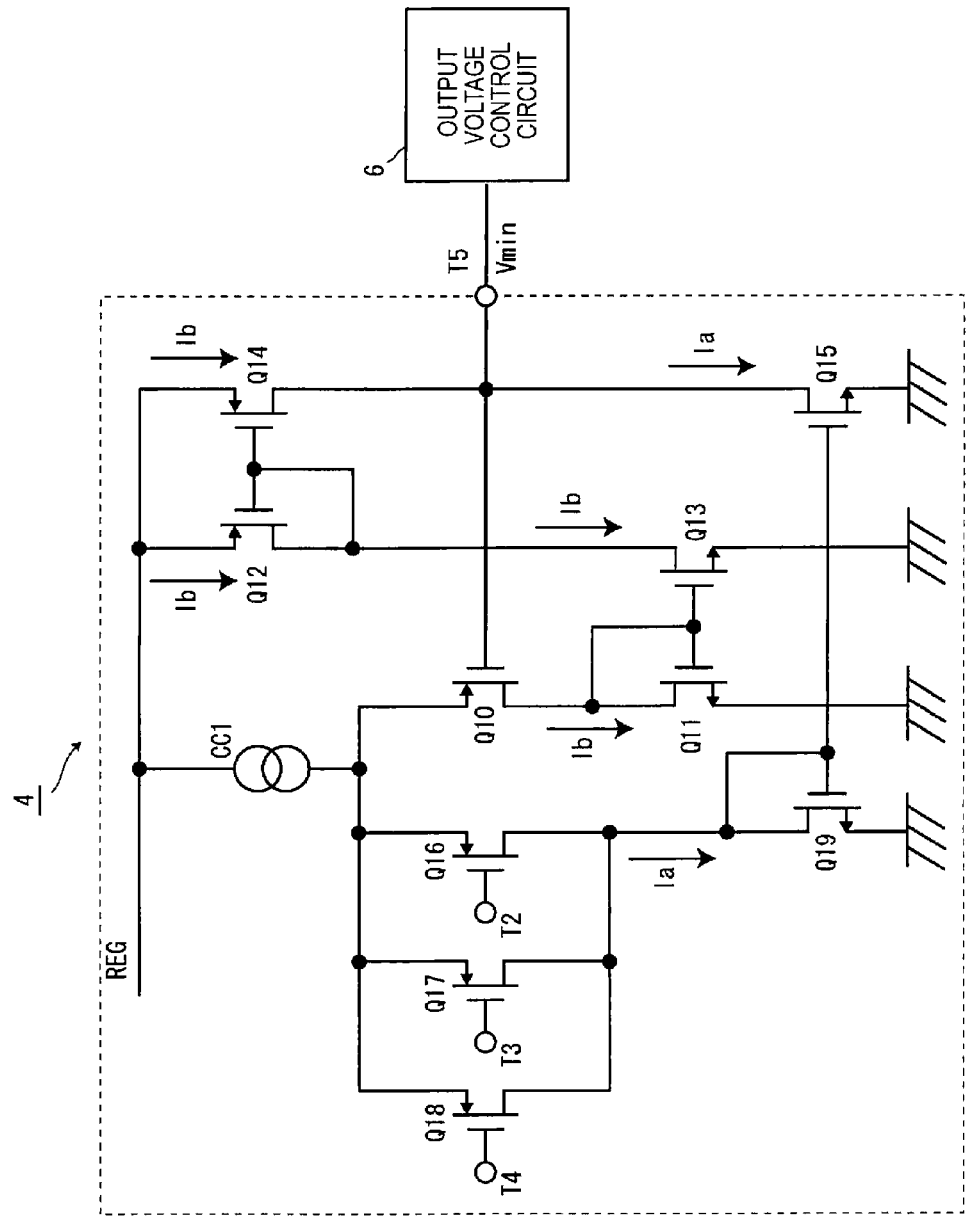
FIG. 2 is a circuit diagram illustrating a circuit configuration of a selection circuit shown in FIG. 1.

The selection circuit 4 selects the smallest current value of the currents flowing through the MOSFETs Q2 to Q4 and outputs a detected voltage Vmin corresponding to the selected current value to the output voltage control circuit 6. Referring to FIG. 2, a series circuit configured by a constant current source CC1, a P-type MOSFET Q10 and an N-type MOSFET Q11 is connected between a control power supply Reg and the earth terminal. Further, a series circuit configured by a P-type MOSFET Q12 and an N-type MOSFET Q13 is connected between the control power supply Reg and the earth terminal and also a series circuit configured by a P-type MOSFET Q14 and an N-type MOSFET Q15 is connected therebetween. Furthermore, a parallel circuit configured by P-type MOSFETs Q16 to Q18 is connected to the control power supply Reg via the constant current source CC1 and connected to the earth terminal via an N-type MOSFET Q19.

The N-type MOSFET Q19 and the N-type MOSFET Q15 are configured to form a current mirror circuit. A gate terminal of the N-type MOSFET Q19 and a gate terminal of the N-type MOSFET Q15 are connected to each other and a connection point thereof is connected to a drain terminal of the N-type MOSFET Q19. Further, the N-type MOSFET Q11 and the N-type MOSFET Q13 are configured to form a current mirror circuit. A gate terminal of the N-type MOSFET Q11 and a gate terminal of the N-type MOSFET Q13 are connected to each other and a connection point thereof is connected to a drain terminal of the N-type MOSFET Q11. Furthermore, the P-type MOSFET Q12 and the P-type MOSFET Q14 are configured to form a current mirror circuit. A gate terminal of the P-type MOSFET Q12 and a gate terminal of the P-type MOSFET Q14 are connected to each other and a connection point thereof is connected to a source terminal of the P-type MOSFET Q12.

A terminal T2 connected to a gate terminal of the P-type MOSFET Q16 is connected to a connection point of the MOSFET Q2 to flashing-drive the light emitting element array 11 and the resistor R1. The resistor R1 is a current detection resistor for detecting the current flowing through the MOSFET Q2 (the light emitting element array 11) and a voltage correlated to the current flowing through the MOSFET Q2 is applied to the gate terminal of the P-type MOSFET Q16. Further, a terminal T3 connected to a gate terminal of the P-type MOSFET Q17 is connected to a connection point of the MOSFET Q3 to flashing-drive the light emitting element array 12 and the resistor R2. The resistor R2 is a current detection resistor for detecting the current flowing through the MOSFET Q3 (the light emitting element array 12) and a voltage correlated to the current flowing through the MOSFET Q3 is applied to the gate terminal of the P-type MOSFET Q17. Furthermore, a terminal T4 connected to a gate terminal of the P-type MOSFET Q18 is connected to a connection point of the MOSFET Q4 to flashing-drive the light emitting element array 13 and the resistor R3. The resistor R3 is a current detection resistor for detecting the current flowing through the MOSFET Q4 (the light emitting element array 13) and a voltage correlated to the current flowing through the MOSFET Q4 is applied to the gate terminal of the P-type MOSFET Q18. In addition, a connection point of the P-type MOSFET Q14 and the N-type MOSFET Q15 is connected to a gate terminal of the P-type MOSFET Q10 and an output terminal T5.

FIG. 2 shows the selection circuit 4 in a state where a total current Ia flowing through the P-type MOSFETs Q16, Q17 and Q18 flows through the N-type MOSFET Q19 and the N-type MOSFET Q15. Here, a current Ib flowing through the P-type MOSFET Q10 flows through the current mirror circuit configured by the P-type MOSFET Q12 and the P-type MOSFET Q14 via the current mirror circuit configured by the N-type MOSFET Q11 and the N-type MOSFET Q13. Accordingly, a voltage signal output from the output terminal T5 becomes a difference signal between the current Ia and the current Ib. However, since the gate terminal of the P-type MOSFET Q10 is connected to the output terminal T5, the gate terminal is operated to cause the current Ia and the current Ib to be equal. Thereby, in the selection circuit 4 shown in FIG. 2, the lowest voltage is selected of the voltage (voltage correlated to the current flowing through the MOSFETs Q2 to Q4) applied to the terminals T2 to T4 and the selected voltage is output as the detected voltage Vmin from the terminal T5 to the output voltage control circuit 6 via a voltage follower using an operational amplifier.

Figure 3:
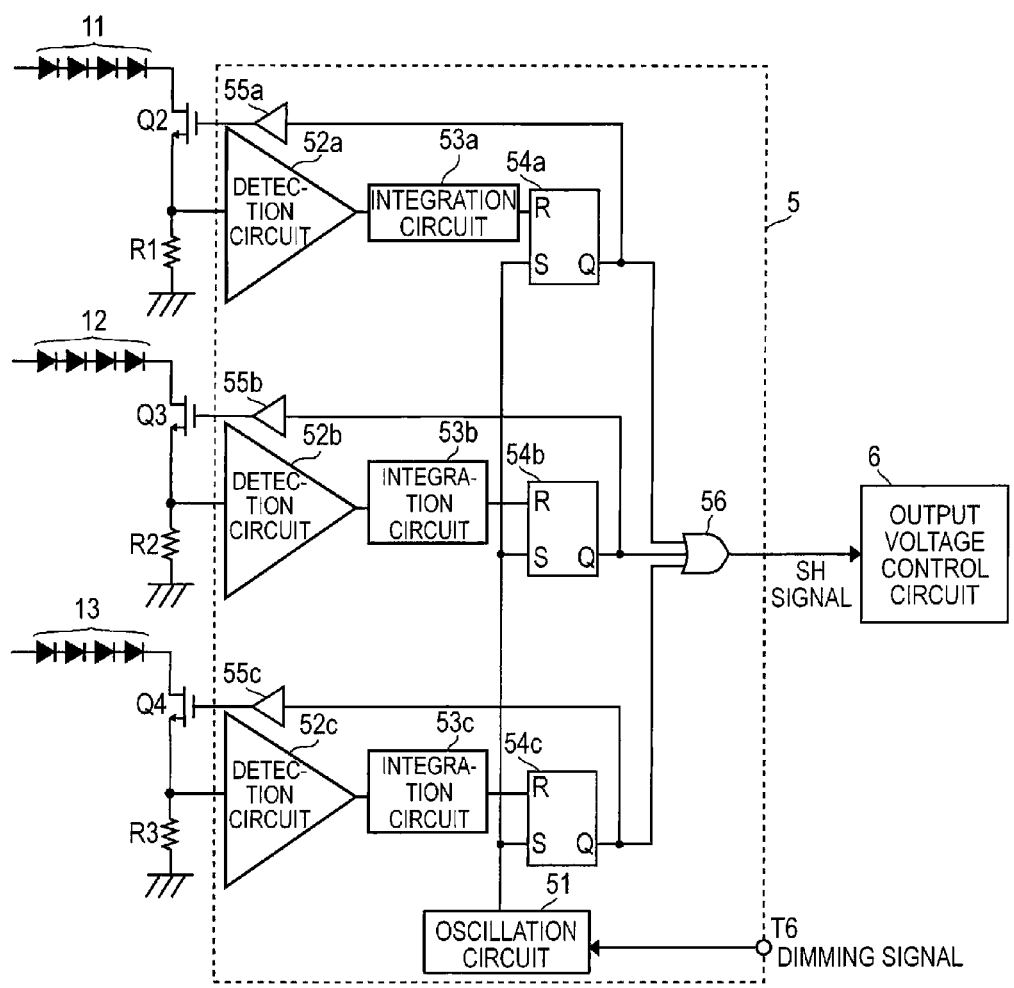
FIG. 3 is a circuit diagram illustrating a circuit configuration of an average current control circuit shown in FIG. 1.

Referring to FIG. 3, the average current control circuit 5 includes an oscillation circuit 51, detection circuits 52a to 52c, integration circuits 53a to 53c, RS-type flip-flop circuits 54a to 54c, drive circuits 55a to 55c and an OR circuit 56.

An input terminal of the oscillation circuit 51 is connected to a terminal T6 to which a dimming signal is input from the outside, and an output terminal of the oscillation circuit 51 is connected to the set terminals S of the flip-flop circuits 54a to 54c. The dimming signal input from the terminal T6 is a signal for controlling the brightness of the light emitting unit 1 by a duty ratio (time ratio). The oscillation circuit 51 performs an oscillation operation when the dimming signal is in an ON-duty state and outputs a set signal to set the flip-flop circuits 54a to 54c at a predetermined period.

An input terminal of the detection circuit 52a is connected to a connection point of the MOSFET Q2 and the resistor R1 and an output terminal of the detection circuit 52a is connected to an input terminal of the integration circuit 53a. An output terminal of the integration circuit 53a is connected to a reset terminal R of the flip-flop circuit 54a. The detection circuit 52a detects the current flowing through the MOSFET Q2 (the light emitting element array 11). The integration circuit 53a integrates the current detected by the detection circuit 52a. The integration circuit 53a outputs a reset signal to reset the flip-flop circuit 54a when the current integrated value reaches a predetermined reference integrated value. Further, an output terminal Q of the flip-flop circuit 54a is connected to an input terminal of the drive circuit 55a. Then, an output terminal of the drive circuit 55a is connected to a gate terminal of the MOSFET Q2. The output terminal Q of the flip-flop circuit 54a outputs an on/off signal, which is turned on by a set signal from the oscillation circuit 51 and turned off by a reset signal from the integration circuit 53a. The drive circuit 55a drives the MOSFET Q2 to be turned on/off based on the on/off signal from the flip-flop circuit 54a.

An input terminal of the detection circuit 52b is connected to a connection point of the MOSFET Q3 and the resistor R2 and an output terminal of the detection circuit 52b is connected to an input terminal of the integration circuit 53b. An output terminal of the integration circuit 53b is connected to a reset terminal R of the flip-flop circuit 54b. The detection circuit 52b detects the current flowing through the MOSFET Q3 (the light emitting element array 12). The integration circuit 53b integrates the current detected by the detection circuit 52b. The integration circuit 53b outputs a reset signal to reset the flip-flop circuit 54b when the current integrated value reaches a predetermined reference integrated value. Further, an output terminal Q of the flip-flop circuit 54b is connected to an input terminal of the drive circuit 55b. Then, an output terminal of the drive circuit 55b is connected to a gate terminal of the MOSFET Q3. The output terminal Q of the flip-flop circuit 54b outputs an on/off signal, which is turned on by a set signal from the oscillation circuit 51 and turned off by a reset signal from the integration circuit 53b. The drive circuit 55b drives the MOSFET Q3 to be turned on/off based on the on/off signal from the flip-flop circuit 54b.

An input terminal of the detection circuit 52c is connected to a connection point of the MOSFET Q4, and the resistor R3 and an output terminal of the detection circuit 52c is connected to an input terminal of the integration circuit 53c. An output terminal of the integration circuit 53c is connected to a reset terminal R of the flip-flop circuit 54c. The detection circuit 52c detects the current flowing through the MOSFET Q4 (the light emitting element array 13). The integration circuit 53c integrates the current detected by the detection circuit 52c. The integration circuit 53c outputs a reset signal to reset the flip-flop circuit 54c when the current integrated value reaches a predetermined reference integrated value. Further, an output terminal Q of the flip-flop circuit 54c is connected to an input terminal of the drive circuit 55c. Then, an output terminal of the drive circuit 55c is connected to a gate terminal of the MOSFET Q4. The output terminal Q of the flip-flop circuit 54c outputs an on/off signal, which is turned on by a set signal from the oscillation circuit 51 and turned off by a reset signal from the integration circuit 53c. The drive circuit 55c drives the MOSFET Q4 to be turned on/off based on the on/off signal from the flip-flop circuit 54c.

When the dimming signal input from the terminal T6 is in the ON-duty state, the flip-flop circuits 54a to 54c are simultaneously set by the set signal from the oscillation circuit 51 and the MOSFETs Q2 to Q4 are simultaneously driven to be turned on. As the MOSFETs Q2 to Q4 are controlled to be turned on, the current is flowing through the light emitting element arrays 11 to 13 and respectively detected by the detection circuits 52a to 52c. The detected current is respectively integrated by the integration circuits 53a to 53c. When the current integrated value in the integration circuits 53a to 53c reaches a predetermined reference integrated value (common in the integration circuits 53a to 53c), the flip-flop circuits 54a to 54c are respectively reset, the MOSFETs Q2 to Q4 are controlled to be turned off, and then the current flowing through the light emitting element arrays 11 to 13 is interrupted. That is, the timing when driving the MOSFETs Q2 to Q4 to be turned off is different in the light emitting element arrays 11 to 13 in accordance with the current flowing through the light emitting element arrays 11 to 13. A duty ratio for driving a plurality of MOSFETs Q2 to Q4 to be turned on/off is controlled so that the average value of the current flowing through the light emitting element arrays 11 to 13 is equal to each other. According to this control, the average value of the current flowing through the light emitting element arrays 11 to 13 is equal to each other. Accordingly, even when the value of the current actually flowing through the light emitting element arrays 11 to 13 is different from each other due to variation in the characteristics of the light emitting element arrays 11 to 13, light can be emitted from the light emitting element arrays 11 to 13 at the same brightness.

Further, each of the output terminals Q of the flip-flop circuits 54a to 54c are respectively connected to an input terminal of the OR circuit 56. An output terminal of the OR circuit 56 is connected to the output voltage control circuit 6 and SH (Sample Hold) signal is output from the OR circuit 56 to the output voltage control circuit 6. In the SH signal output from the OR circuit 56, a period when on-signal is output from any one of the flip-flop circuits 54a to 54c, that is, an ON-period of a switching element, in which any one of the MOSFETs Q2 to Q4 is driven to be turned on, is referred to as a sample period, and a period when off-signal is output from all of the flip-flop circuits 54a to 54c, that is, an OFF-period of a switching element, in which all of the MOSFETs Q2 to Q4 are controlled to be turned off, is referred to as a hold period.

Figure 4:
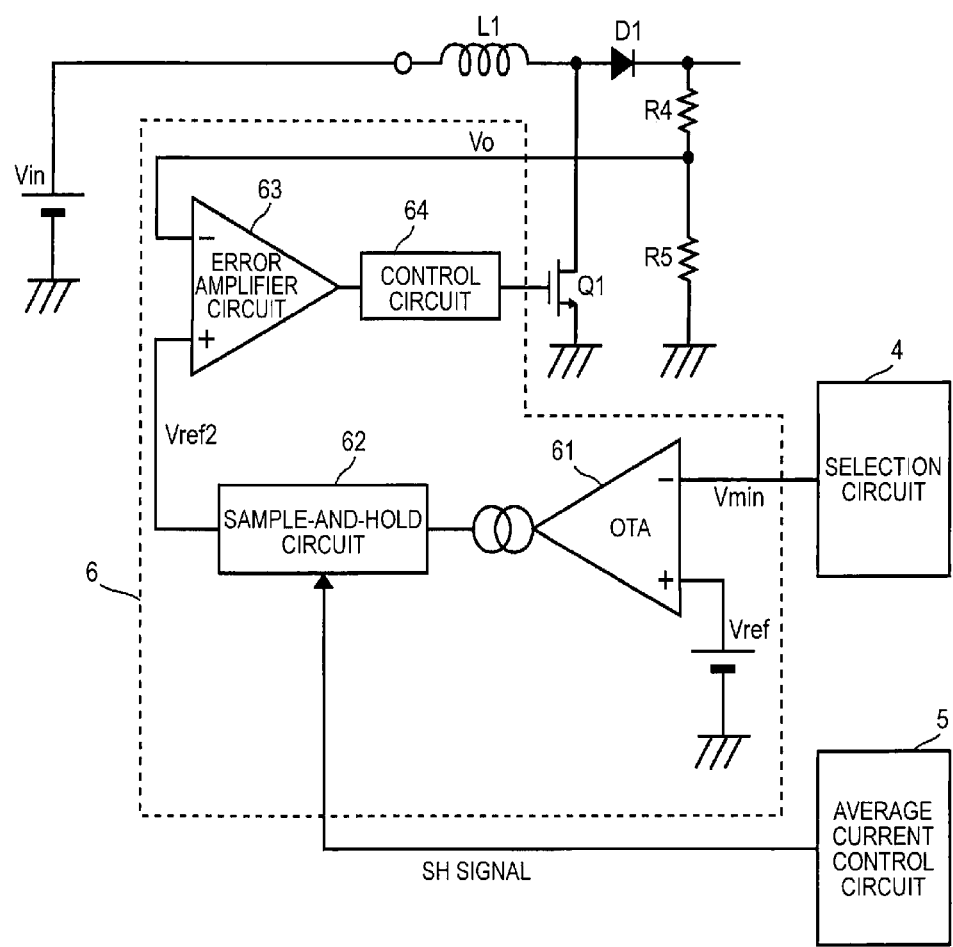
FIG. 4 is a circuit diagram illustrating a circuit configuration of an output voltage control circuit shown in FIG. 1.

Referring to FIG. 4, the output voltage control circuit 6 includes OTA (Operational Transconductance Amplifier) error amplifier circuit 61, a sample-and-hold circuit 62, an error amplifier circuit 63, a control circuit 64 and a reference voltage Vref.

The reference voltage Vref is applied to a non-inverting input terminal of the OTA error amplifier circuit 61 and the detected voltage Vmin from the selection circuit 4 is input to an inverting input terminal of the OTA error amplifier circuit 61. The OTA error amplifier circuit 61 is a circuit, which compares the reference voltage Vref and the detected voltage Vmin and outputs an error signal therebetween. From an output terminal of the OTA error amplifier circuit 61, an error current corresponding to an error voltage between the reference voltage Vref and the detected voltage Vmin is output as the error signal.

The SH signal from the average current control circuit 5 is input to a control terminal of the sample-and-hold circuit 62. During the sample period of the SH signal, the sample-and-hold circuit 62 detects an output current from the OTA error amplifier circuit 61 and outputs a variable reference voltage Vref2 according to the detection result. Further, during the hold period of the SH signal, the sample-and-hold circuit 62 maintains the detection result and outputs the last variable reference voltage Vref2 as it is.

The variable reference voltage Vref2 from the sample-and-hold circuit 62 is applied to a non-inverting input terminal of the error amplifier circuit 63 and a voltage Vo obtained by dividing the output voltage Vout at the resistor R4 and the resistor R5 is input to an inverting input terminal of the error amplifier circuit 63. The error amplifier circuit 63 is a circuit, which compares the variable reference voltage Vref2 and the voltage Vo corresponding to the output voltage Vout and outputs an error signal therebetween. An error voltage between the variable reference voltage Vref2 and the voltage Vo is amplified and output from an output terminal of the error amplifier circuit 63 as the error signal. The control circuit 64 drives the MOSFET Q1 to be turned on/off based on the error signal from the error amplifier circuit 63.

In this way, the output voltage control circuit 6 controls the output voltage Vout so that the detected voltage Vmin from the selection circuit 4 becomes the reference voltage Vref. Here, the detected voltage Vmin from the selection circuit 4 is the lowest voltage of the voltage correlated to the current flowing through the MOSFETs Q2 to Q4 in the sample period of the SH signal (the ON-period of the switching element in which any one of the MOSFETs Q2 to Q4 is driven to be turned on and when any of the light emitting element arrays 11 to 13 is turned on). For example, when all of the MOSFETs Q2 to Q4 are turned on, the voltage correlated to the smallest current flowing through the MOSFETs Q2 to Q4 is the detected voltage Vmin. Further, when the MOSFET Q2 is turned on and the MOSFETs Q3 and Q4 are turned off, the voltage correlated to the current flowing through the MOSFET Q2 is the detected voltage Vmin. Accordingly, in the sample period of the SH signal, the output voltage control circuit 6 controls the output voltage Vout so that the smallest current of the current flowing through the MOSFETs Q2 to Q4 is a preset reference current value. The reference current value is determined by the reference voltage Vref. Since the current actually flowing through the MOSFETs Q2 to Q4 is larger or smaller relative to the reference current value, the reference voltage Vref is set so that the reference current value is slightly larger than a lower limit current value to make the light emitting element arrays 11 to 13 emit light.

Figure 5:
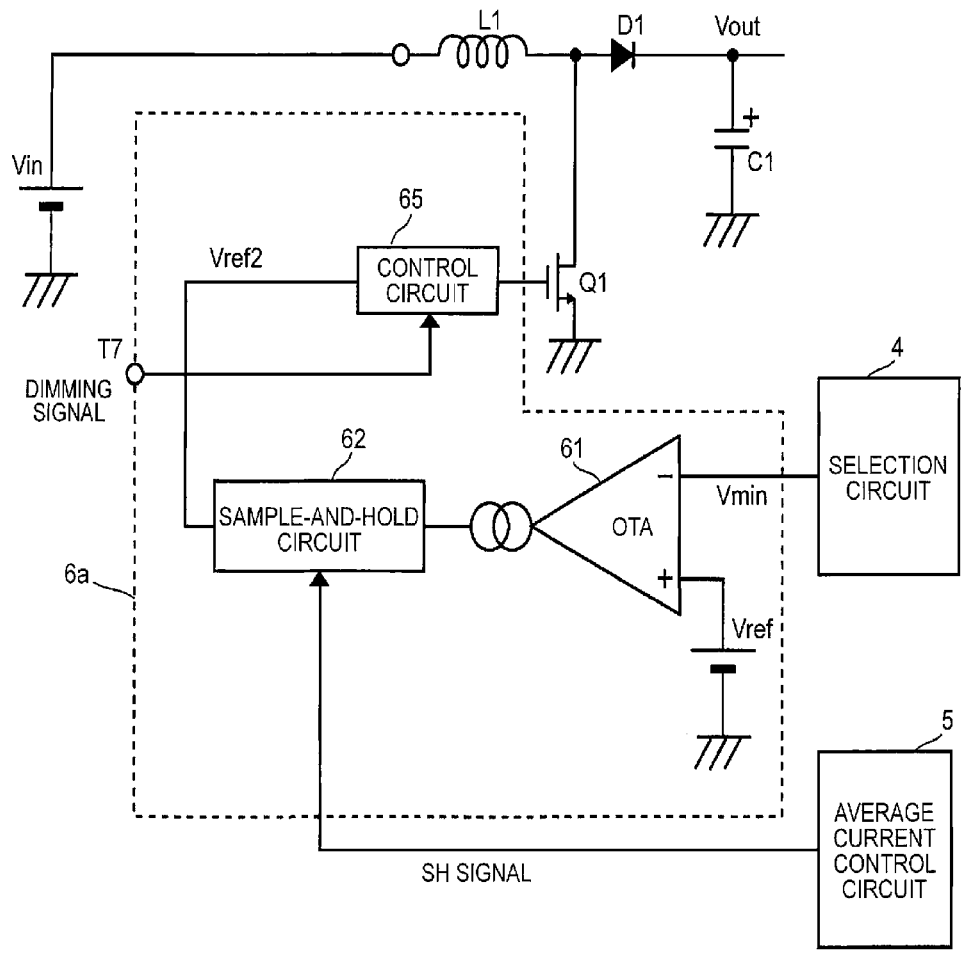
FIG. 5 is a circuit diagram illustrating another circuit configuration of the output voltage control circuit shown in FIG. 1.

In the present illustrative embodiment, the output voltage control circuit 6 is configured to control the output voltage Vout based on the error signal from the comparison error amplifier circuit 63, which compares the variable reference voltage Vref2 with the voltage Vo corresponding to the output voltage Vout. However, the output voltage Vout may be controlled based on the variable reference voltage Vref2 without using the comparison error amplifier circuit 63. FIG. 5 shows an output voltage control circuit 6a including a control circuit 65, which controls the output voltage Vout based on the variable reference voltage Vref2. The output voltage control circuit 6a is provided with a terminal T7 to which a dimming signal is input from the outside. The dimming signal for controlling the brightness of the light emitting unit 1 by the duty ratio (time ratio) is input to a control terminal of the control circuit 65. The control circuit 65 drives the MOSFET Q1 to be turned on/off based on the variable reference voltage Vref2 when the dimming signal is in an ON-duty state. In addition, the control circuit 65 is adapted to stop the on/off drive of the MOSFET Q1 when the dimming signal is in an OFF-duty state. As a result, the supply of power to the smoothing capacitor C1 is stopped when the dimming signal is in the OFF-duty state. Accordingly, it is possible to prevent the supply amount of power to the smoothing capacitor C1 from excessively increasing and thus to prevent the output voltage Vout from unnecessarily increasing. In this method, the supply of power to the smoothing capacitor C1 is completely stopped when the dimming signal is in the OFF-duty state. Accordingly, this method is effective in the case where the leakage current from the smoothing capacitor C1 is a negligible value.

As described above, the present illustrative embodiment is directed to a light emitting element driving device that flashing-drive a plurality of light emitting element arrays 11 to 13 connected in parallel by the switching elements (MOSFETs Q2 to Q4) connected in series with each of the plurality of light emitting element arrays 11 to 13. The light emitting element driving device includes the current detection resistors R1 to R3, the selection circuit 4 and the output voltage control circuit 6. Each of the current detection resistors R1 to R3 detects the current flowing through each of the plurality of light emitting element arrays 11 to 13 as the current of the light emitting element arrays. The selection circuit 4 selects the smallest current of the light emitting element arrays. The output voltage control circuit 6 controls the output voltage Vout supplied to the plurality of light emitting element arrays 11 to 13 so that the current of the light emitting element arrays 11 to 13 selected by the selection circuit 4 becomes a preset reference current value. Accordingly, it is not necessary to use a constant-current driver in order to flashing-drive the light emitting element arrays 11 to 13 and thus it is possible to reduce power loss in the switching elements (MOSFETs Q2 to Q4) that flashing-drive the light emitting element arrays 11 to 13.

In addition, according to the present illustrative embodiment, the light emitting element driving device is provided with the average current control circuit 5. The average current control circuit 5 controls each of the duty ratios to drive the plurality of the switching elements (MOSFETs Q2 to Q4) to be turned on/off so that the average value of the current of the plurality of light emitting element arrays is equal to each other. Accordingly, even when the value of the current actually flowing through the light emitting element arrays 11 to 13 is different from each other due to variation in the characteristics of the light emitting element arrays 11 to 13, light can be emitted from the light emitting element arrays 11 to 13 at the same brightness.

Further, according to the present illustrative embodiment, the output voltage control circuit 6 is configured to control the output voltage Vout based on the current of the light emitting element arrays, in the ON-period of the switching elements in which any one of the plurality of the switching element (MOSFETs Q2 to Q4) is driven to be turned on. Then, the output voltage control circuit 6 is configured to control the output voltage Vout based on the current of the light emitting element arrays in the last ON-period of the switching element, in the OFF-period of the switching elements in which all of the plurality of the switching elements (MOSFETs Q2 to Q4) are controlled to be turned off. Thereby, even when all of the plurality of the switching elements (MOSFETs Q2 to Q4) are controlled to be turned off and the current of the light emitting element arrays is not detected, the output voltage Vout can be controlled on the basis of the current of the light emitting element arrays in the last ON-period of the switching element. As a result, a stable feedback control can be performed.

Further, according to this disclosure, the output voltage control circuit 6 is configured to generate the variable reference voltage Vref2 based on the current of the light emitting element arrays selected by the selection circuit 4 and to perform a feedback control of the output voltage Vout based on the variable reference voltage Vref2. Thereby, even when all of the plurality of the switching elements (MOSFETs Q2 to Q4) are controlled to be turned off, the output voltage is controlled so that the variable reference voltage Vref2 and the voltage Vo obtained by dividing the output voltage Vout are equal to each other. Accordingly, it is suppressed that the output voltage Vout is excessively increased or decreased and therefore a stable feedback control can be performed.

Hereinabove, this disclosure has been explained with reference to the specific illustrative embodiment. However, the specific illustrative embodiment is illustrated only as an example, and it is obvious that various modifications can be applied without departing a spirit and a scope of this disclosure.

What is claimed is:

1. A light emitting element driving device, which flashing-drive a plurality of light emitting element arrays connected in parallel by switching elements connected in series with each of the plurality of light emitting element arrays, the light emitting element driving device comprising:
    a current detection unit configured to detect respective currents flowing through each of the plurality of light emitting element arrays as currents of the light emitting element arrays;
    a selection unit configured to select the smallest current of the light emitting element arrays of the detected currents obtained by the current detection unit; and
    an output voltage control unit configured to control output voltage supplied to the plurality of light emitting element arrays so that the current of the light emitting element arrays selected by the selection unit becomes a preset reference current value,
    wherein, in an ON-period of the switching elements in which any one of the plurality of the switching elements is driven to be turned on, the output voltage control unit controls the output voltage based on the current of the light emitting element arrays, and
    wherein, in an OFF-period of the switching elements in which all of the plurality of switching elements are controlled to be turned off, the output voltage control unit controls the output voltage based on the current of the light emitting element arrays in a last ON-period of the switching elements.

2. The light emitting element driving device according to claim 1, further comprising
    an average current control unit configured to control each duty ratio to drive the plurality of the switching elements to be turned on/off so that the average values of the current of the plurality of light emitting element arrays detected by the current detection unit are equal to each other.

3. The light emitting element driving device according to claim 1, wherein the output voltage control unit is configured to generate a reference voltage correlated to the current of the light emitting element arrays selected by the selection unit and to perform a feedback control of the output voltage based on the reference voltage.

* * * * *